Nov. 27, 1923.
W. R. MORGAN
NUT TAPPING MACHINE
Filed Nov. 29, 1922
1,475,711
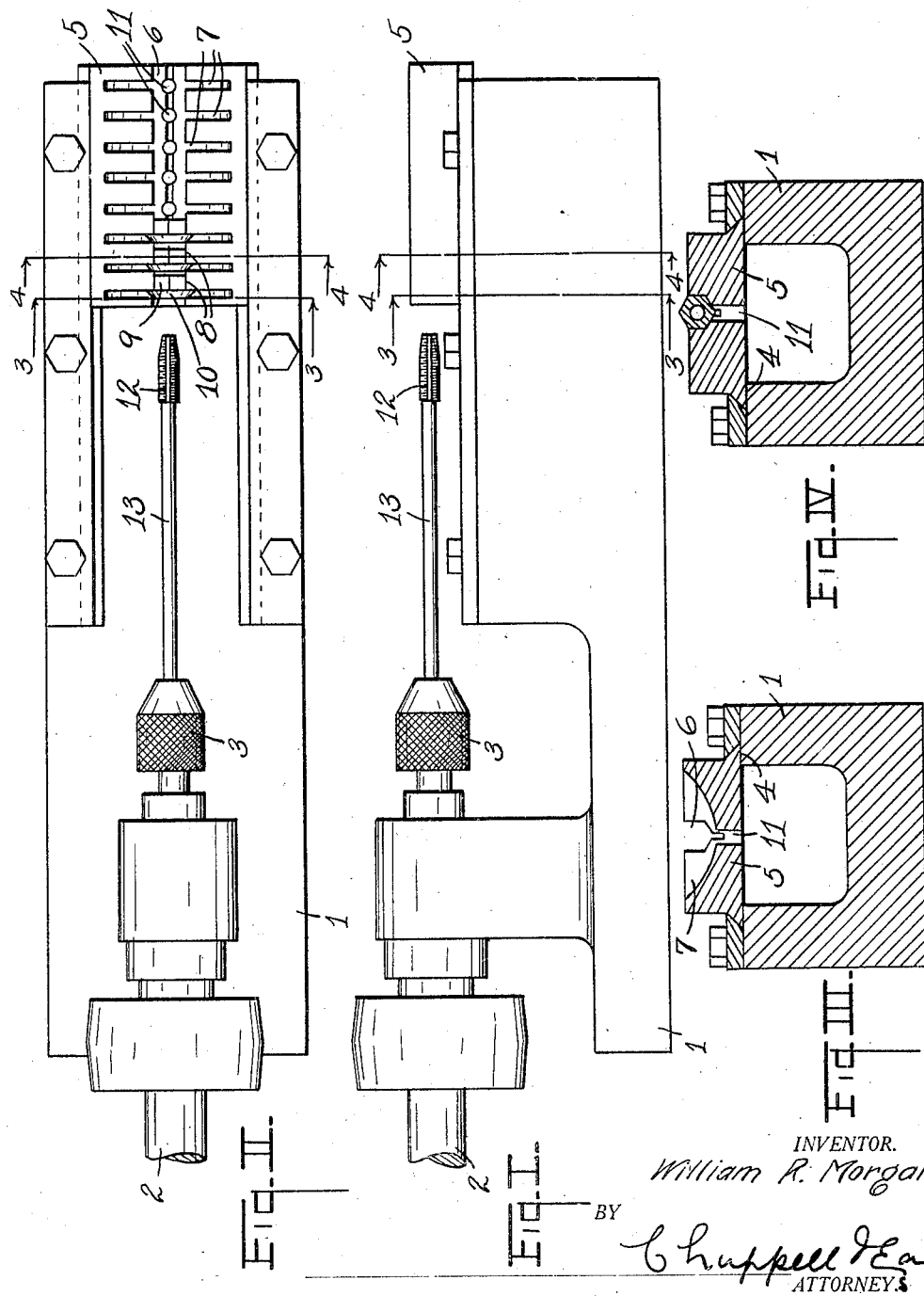
INVENTOR.
William R. Morgan
BY
Chappell & Earl
ATTORNEYS Patented Nov. 27, 1923.

1,475,711

UNITED STATES PATENT OFFICE.

WILLIAM R. MORGAN, OF JACKSON, MICHIGAN.

NUT-TAPPING MACHINE.

Application filed November 29, 1922. Serial No. 603,936.

*To all whom it may concern:*

Be it known that I, WILLIAM R. MORGAN, a citizen of the United States, residing at the city and county of Jackson, State of Michigan, have invented certain new and useful Improvements in Nut-Tapping Machines, of which the following is a specification.

This invention relates to improvements in nut tapping machines.

The main object of this invention is to provide an improved nut tapping machine which is very simple in structure and in manipulation, and, at the same time, is of large capacity.

A further object is to provide a nut tapping machine having these advantages which makes possible very uniform work.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this application, in which:

Fig. I is a side elevation of a nut tapping machine embodying the features of my invention, only such portions of the machine being illustrated as are deemed necessary to show an embodiment or adaptation of my improvements and parts being shown mainly in conventional form.

Fig. II is a plan view.

Fig. III is a transverse section on a line corresponding to line 3—3 of Figs. I and II.

Fig. IV is a transverse section on a line corresponding to line 4—4 of Figs. I and II.

In the drawing the sectional views are taken looking in the direction of the little arrows at the ends of the section lines and similar numerals of reference refer to similar parts in all of the views.

Referring to the drawing, 1 represents the bed of the machine, 2 the spindle and 3 the chuck. The bed 1 is provided with a way 4 for the carriage 5. This carriage is, in the embodiment illustrated, formed of a block and has a longitudinal groove 6 therein and a plurality of transverse grooves 7 providing a series of holders 8 for the nuts 9, the flanges 10 of the nuts resting in the slots. These slots in the structure illustrated are longer than is required as it is convenient to form them in this way with a milling cutter.

The carriage is provided with holes 11 below each holder for the escape of the chips. The nuts 9 are arranged in the series of holders and are supported thereby in alinement so that the tap 12 engages them successively. The tap is provided with a long shank 13 so that it acts on all of the nuts in the carriage or holders successively. All of the nuts may be placed in the carriage and the carriage then pushed up to the tap, or, if desired, the first nut may be placed in the holder and the carriage pushed up to the tap, the operator placing the other nuts after the work has been begun on the first.

When the work is completed on a series of nuts the chuck is released and the tap removed from the rear of the carriage. The spindle of the tap may be utilized if desired to lift the load of nuts from the carriage. This enables very rapid and accurate work on the machine.

Having thus described my invention what I claim as new and desire to secure by Letters Patent is:

1. In a nut tapping machine, the combination of a spindle provided with a tool chuck, a work carriage slidable longitudinally of said spindle and provided with a longitudinal groove conformed in cross section to the nuts to be tapped and with a series of slots disposed transversely of the groove to receive the nut flanges providing a plurality of holders open at the top to receive the nuts which are supported thereby in alinement to be successively acted upon by a tap, and a tap provided with a spindle permitting it to successively act on the series of nuts whereby the carriage is automatically fed by the tap and when the work is completed the tap may be released from the chuck and removed from the rear of the carriage with the work thereon.

2. In a nut tapping machine, the combination of a spindle provided with a tool chuck, a work carriage slidable longitudinally of said spindle and provided with a plurality of holders open at the top to receive the nuts which are supported thereby in alinement to be successively acted upon by a tap, and a tap provided with a spindle permitting it to successively act on the series of nuts whereby, when the work is completed, the tap may be released from the chuck and removed from the rear of the carriage with the work thereon.

3. In a nut tapping machine, the combination of a spindle provided with a tool chuck, a work carriage slidable longitudinally of said spindle and provided with a longitudinal groove conformed in cross section to the nuts to be tapped and with a series of slots disposed transversely of the groove to receive the nut flanges providing a plurality of holders open at the top to receive the nuts which are supported thereby in alinement to be successively acted upon by a tap, there being a series of holes in the bottom of the groove for the discharge of the chips, and a tap provided with a spindle permitting it to successively act on the series of nuts.

4. In a nut tapping machine, the combination of a spindle provided with a tool chuck, a work carriage movable longitudinally of said spindle and provided with a plurality of holders adapted to support a plurality of nuts in alinement and in spaced relation to be successively acted upon by a tap, and a tap provided with a spindle permitting it to successively act on the series of nuts whereby the carriage is automatically fed by the tap and when the work is completed the tap may be released from the chuck and removed from the rear of the carriage with the work thereon.

5. In a nut tapping machine, the combination of a spindle provided with a tool chuck, a work carriage movable longitudinally of said spindle and provided with a plurality of holders adapted to support a plurality of nuts in alinement and in spaced relation to be successively acted upon by a tap, and a tap provided with a spindle permitting it to successively act on the series of nuts whereby, when the work is completed, the tap may be released from the chuck and removed from the rear of the carriage with the work thereon.

In witness whereof, I have hereunto set my hand and seal.

WILLIAM R. MORGAN. [L. S.]